United States Patent
Gaur et al.

(10) Patent No.: US 11,818,206 B2
(45) Date of Patent: *Nov. 14, 2023

(54) VISIBILITY OF DIGITAL ASSETS AT CHANNEL LEVEL

(71) Applicant: International Business Machines Corporation, Armonk, NY (US)

(72) Inventors: Nitin Gaur, Round Rock, TX (US); Petr Novotny, Mount Kisco, NY (US); Jeronimo Irazabal, Roque Perez (AR); Timothy Olson, Port Orchard, WA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/181,841

(22) Filed: Mar. 10, 2023

(65) Prior Publication Data

US 2023/0208911 A1    Jun. 29, 2023

Related U.S. Application Data

(63) Continuation of application No. 17/130,329, filed on Dec. 22, 2020, now Pat. No. 11,606,425.

(51) Int. Cl.
  *H04L 67/1061* (2022.01)
  *H04L 67/1074* (2022.01)
  *H04L 9/32* (2006.01)
  *H04L 9/00* (2022.01)

(52) U.S. Cl.
  CPC ........ *H04L 67/1065* (2013.01); *H04L 9/3215* (2013.01); *H04L 9/3247* (2013.01); *H04L 67/1074* (2013.01); *H04L 9/50* (2022.05)

(58) Field of Classification Search
  CPC . H04L 67/1065; H04L 9/3215; H04L 9/3247; H04L 67/1074; H04L 9/50
  See application file for complete search history.

(56) References Cited

U.S. PATENT DOCUMENTS

| 2007/0168539 | A1 | 7/2007 | Day | |
| 2016/0260095 | A1* | 9/2016 | Ford | ................ H04L 9/3242 |
| 2016/0330034 | A1 | 11/2016 | Back | |

(Continued)

FOREIGN PATENT DOCUMENTS

| JP | 2019511150 A | 4/2019 |
| WO | 2020038332 A1 | 2/2020 |

OTHER PUBLICATIONS

Patel, et al., IC-BCT 2019, Proceedings of the International Conference on Blockchain Technology, Jun. 20, 2020, p. 119-132 (Year: 2019).*

(Continued)

*Primary Examiner* — Gil H. Lee
*Assistant Examiner* — Chhian (Amy) Ling
(74) *Attorney, Agent, or Firm* — Haley J. McClory

(57) ABSTRACT

The processor may collect, from a first peer, a first data set associated with a channel. The channel may include one or more assets associated with a first peer. The channel may link the first peer to a second peer. The processor may analyze the first data set to determine a first status for the one or more assets. The processor may provide the first status of the one or more assets in a viewable channel to the blockchain network.

20 Claims, 7 Drawing Sheets

(56) References Cited

U.S. PATENT DOCUMENTS

| | | |
|---|---|---|
| 2017/0085545 A1 | 3/2017 | Lohe |
| 2017/0295023 A1 | 10/2017 | Madhavan |
| 2018/0316602 A1 | 11/2018 | Chen |
| 2018/0324154 A1 | 11/2018 | Crabtree |
| 2019/0384627 A1 | 12/2019 | De Caro |
| 2020/0151350 A1 | 5/2020 | Irazabal |
| 2020/0175601 A1 | 6/2020 | Letourneau |
| 2020/0327616 A1 | 10/2020 | Burke |
| 2020/0358612 A1 | 11/2020 | Vigneron |
| 2022/0201071 A1 | 6/2022 | Gaur |

OTHER PUBLICATIONS

Androulaki, E., et al., "Channels: Horizontal Scaling and Confidentiality on Permissioned Blockchains." Published 2018. 18 pages. Published by IBM Research. Zurich, Switzerland.

Anonymous. "The Basics of State Channels." Accessed Oct. 9, 2020. 13 pages. Published by district0x, <https://education.district0x.io/general-topics/understanding-ethereum/basics-state-channels/>.

Burchert, C., et al., "Scalable funding of Bitcoin micropayment channel networks." Published Aug. 29, 2018. 15 pages. Royal Society Open Science, vol. 5, 8, <https://doi.org/10.1098/rsos.180089>.

Chakravarty, M., et al., "Hydra: Fast Isomorphic State Channels." Published 2020. 61 pages. IACR Cryptol.

Kesonpat, N., "Bitcoin Scaling, Lightning Network & The Future with Micropayments." Published Jan. 25, 2019. Accessed Oct. 9, 2020. 19 pages. Published by Nichanan Kesonpat, <https://www.nichanank.com/blog/2019/1/5/bitcoin-scaling-lightning-network-micropayments>.

Mell, et al., "The NIST Definition of Cloud Computing," Recommendations of the National Institute of Standards and Technology, U.S. Department of Commerce, Special Publication 800-145, Sep. 2011, 7 pgs.

Miller, A., et al., "Sprites and State Channels: Payment Networks that Go Faster than Lightning." Published Nov. 30, 2017. In International Conference on Financial Cryptography and Data Security (pp. 508-526). Springer, Cham, <https://arxiv.org/abs/1702.05812>.

Siris, V., et al., "Interledger Approaches." Published Jul. 4, 2019. 19 pages. IEEE Access, 7, pp. 89948-89966, <https://doi.org/10.1109/ACCESS.2019.2926880>.

Stark, J., "Making Sense of Ethereum's Layer 2 Scaling Solutions: State Channels, Plasma, and Truebit." Published Feb. 12, 2018. Printed Aug. 5, 2020. 18 pages. Published by Medium, <https://medium.com/l4-media/making-sense-of-ethereums-layer-2-scaling-solutions-state-channels-plasma-and-truebit-22cb40dcc2f4>.

Unknown, "The District Registry—districtox Education Portal," <https://education.district0x.io/district0x-specific-topics/understanding-distict0x/the-district-registry/>, printed Dec. 21, 2020, 2 pgs.

Appendix P—List of IBM Patents or Patent Applications Treated as Related, Filed herewith, 2 Pages.

* cited by examiner

VISIBILITY OF DIGITAL ASSETS AT CHANNEL LEVEL

BACKGROUND

The present disclosure relates generally to the field of blockchain storage, and more particularly to maintaining integrity of the blockchain while scaling the blockchain network.

As blockchain networks gain popularity, so too has the need to scale blockchain networks to accommodate the increase in the blockchain network's use. Despite blockchain networks often having static structures, various scaling configurations and/or methodologies (e.g., micropayment channels) have been developed. Such configurations and/or methodologies can allow some transactions to occur off blockchain. Reducing the number of transactions that must be processed by the blockchain network, can increase blockchain processing as well as reduce amount of data required to be stored in the blockchain. While these configurations and methodologies offer a plethora of benefits, there are also drawbacks. These drawbacks could include obscuring asset related information from other blockchain network participants. Such behaviors and lack of clarity and visibility of asset related information could increase the possibility or appearance of blockchain inaccuracies and/or malicious behavior. This could result in a decrease in trust in the blockchain network. As such, identifying potential solutions that allow for an increase in visibility of the off blockchain transactions while maintaining trust in the blockchain network, is necessary.

SUMMARY

Embodiments of the present disclosure include a method, system, and computer program product for generating a channel level view of assets in a blockchain network. A processor may collect, from a first peer, a first data set associated with a channel. The channel may include one or more assets associated with a first peer. The channel may link the first peer to a second peer. The processor may analyze the first data set to determine a first status for the one or more assets. The processor may provide the first status of the one or more assets in a viewable channel to the blockchain network.

The above summary is not intended to describe each illustrated embodiment or every implementation of the present disclosure.

BRIEF DESCRIPTION OF THE DRAWINGS

The drawings included in the present disclosure are incorporated into, and form part of, the specification. They illustrate embodiments of the present disclosure and, along with the description, serve to explain the principles of the disclosure. The drawings are only illustrative of certain embodiments and do not limit the disclosure.

Figure 1A:
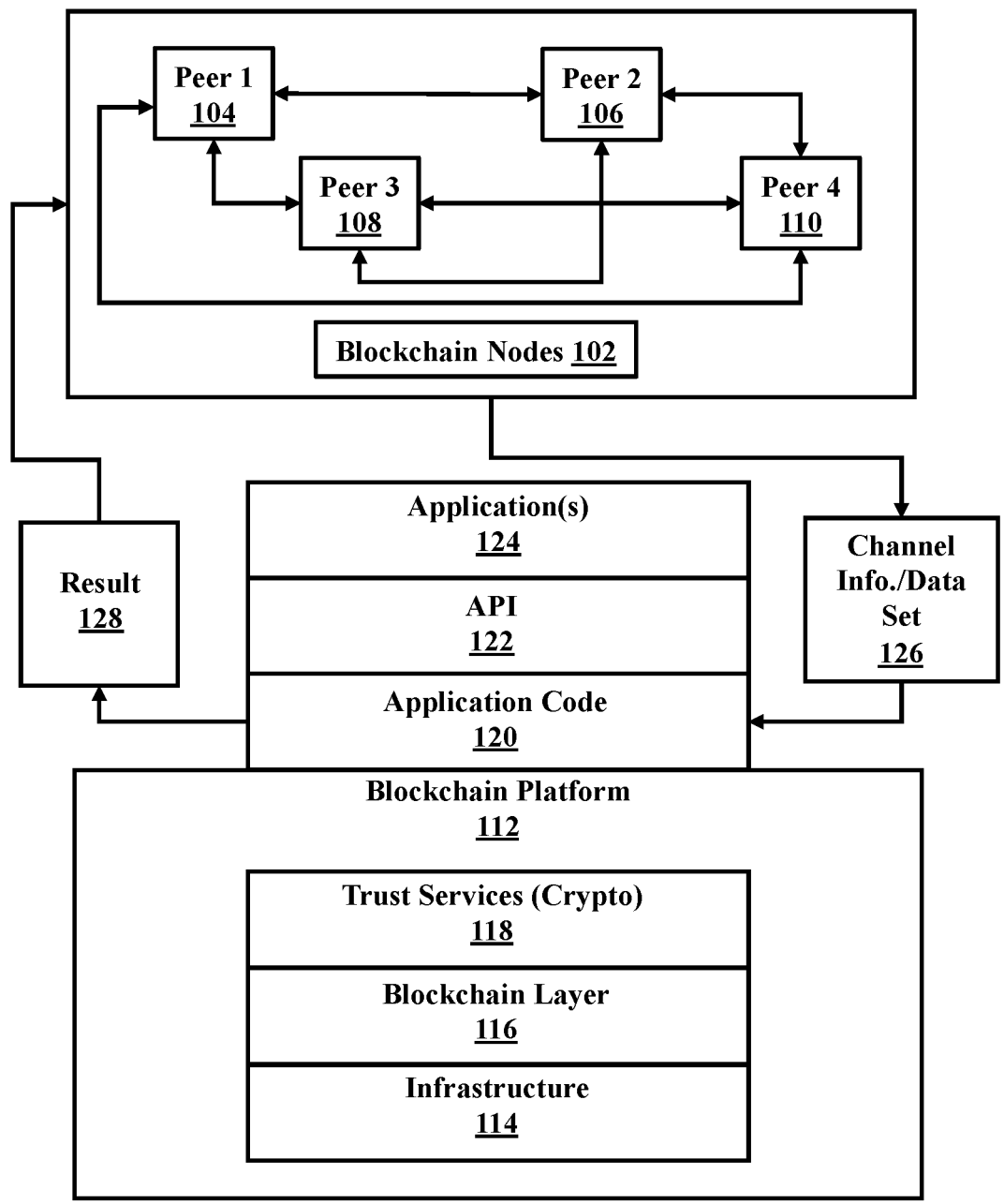
FIG. 1A illustrates an example blockchain architecture, in accordance with embodiments of the present disclosure.

While the embodiments described herein are amenable to various modifications and alternative forms, specifics thereof have been shown by way of example in the drawings and will be described in detail. It should be understood, however, that the particular embodiments described are not to be taken in a limiting sense. On the contrary, the intention is to cover all modifications, equivalents, and alternatives falling within the spirit and scope of the disclosure.

DETAILED DESCRIPTION

Aspects of the present disclosure relates generally to the field of blockchain storage, and more particularly to maintaining integrity of the blockchain while scaling the blockchain network.

Generally, blockchain networks have a static structure that cannot be easily scaled to dynamically increase or decrease (e.g., scale up or scale down) the resources available to the blockchain network. As such, if a blockchain network receives a large influx of transactions, the blockchain network may not be able to immediately process the transactions and a queue or backlog of transaction can be created. In such situations where the blockchain network is overloaded, the efficiency and the usability of the blockchain can decrease. As mentioned herein, because blockchain networks are often configured using static structures, generally traditional methods of scaling cannot be used or are not practical. As such, one technique to ensure efficient use of the blockchain network is to minimize the number of transactions required to be processed and committed to the blockchain.

While various blockchain configurations associated with minimizing the number of transactions required to be processed by the blockchain network exist, one configuration that allow such a reduction in transaction processing is the use of state channels. State channels may refer to the process which users (e.g., peers) are able to transact with one another outside the blockchain (e.g., off-chain). While state channels are similar in concept to the Bitcoin's payment channels, Bitcoin's payment channels traditionally only support payment transactions, whereas state channels also support traditional state updates. For example, a state channel could be used to collect votes (e.g., assets) for a poll. In this example, a state channel may be linked to each of the entities who is providing the votes. As each vote is received, the state (e.g., key, value, version) of the poll or vote count, may be updated. While the state channel is open and/or until the vote is complete, no transactions associated with vote in the state channel are processed or committed to the blockchain. In this example, only once all the votes have been collected does the state channel broadcast the asset's (e.g., vote's) state update to the blockchain network.

In this example, the transactions or votes are/were all processed in the state channel, "off-chain", and only one transaction, the only final vote count via the updated state, are/were committed to the blockchain ledger. The processes associated with a state channel can be understood in the context of a timecard where an employee stamps their timecard indicating the time they started and then stamps their timecard a second time indicating the time the workday finished. In this example the timecard indicates the total hours worked, but does not include a digest of every minute worked on by the employee. If the employee's timecard were the state channel, the start time would likely be read from the main blockchain ledger, and each increment of time (e.g., transaction) associated with the workday would update time on the timecard (e.g., update the state). When the work was finished and no more increments of time could be added, the final updated time would be reflected in the state changes. In this example, the final time (e.g., the updated state) would be committed to the main blockchain ledger.

Unfortunately, while state channels can increase the throughput or efficiency of the blockchain because of the decrease in processing or computational load, state channels and other similar "off-chain" configurations (e.g., micropayment channels) can produce additional issues or problems. These problems can arise from the lack of visibility of the activity occurring in state channels while assets are transacted between two or more entities. In many situations, only the initial value of the asset and the final value of the asset is recorded in the main blockchain ledger (e.g., is visible). Because the majority of activity (e.g., transactions associated with an asset) in the state channel are hidden from the view of other entities (e.g., other peers in the blockchain network not participating in the particular state channel) could result in significant blockchain issues, including, but not limited to blockchain integrity, asset tracking, and system wide accounting of assets.

As such, a method for generating a channel level view of assets in a blockchain network, that allows for one or more entities (e.g., peers) in the blockchain network (e.g., blockchain network 200 [discussed in more detail below]) to view, at least a portion of the information associated with the activity occurring in the channel, is provided. Methods and embodiments discussed herein can generally collect, from a particular peer, a channel data set associated with one or more channels having one or more assets and analyze the information contained in the channel data set to determine a status (e.g., first status) of the one or more assets. Embodiments discussed herein may then provide the status of the one or more assets associated with a peer in a viewable channel to the blockchain network.

It will be readily understood that the instant components, as generally described and illustrated in the figures herein, may be arranged and designed in a wide variety of different configurations. Accordingly, the following detailed description of the embodiments of at least one of a method, apparatus, non-transitory computer readable medium and system, as represented in the attached figures, is not intended to limit the scope of the application as claimed but is merely representative of selected embodiments.

The instant features, structures, or characteristics as described throughout this specification may be combined or removed in any suitable manner in one or more embodiments. For example, the usage of the phrases "example embodiments," "some embodiments," or other similar language, throughout this specification refers to the fact that a particular feature, structure, or characteristic described in connection with the embodiment may be included in at least one embodiment. Accordingly, appearances of the phrases "example embodiments," "in some embodiments," "in other embodiments," or other similar language, throughout this specification do not necessarily all refer to the same group of embodiments, and the described features, structures, or characteristics may be combined or removed in any suitable manner in one or more embodiments. Further, in the FIGS., any connection between elements can permit one-way and/or two-way communication even if the depicted connection is a one-way or two-way arrow. Also, any device depicted in the drawings can be a different device. For example, if a mobile device is shown sending information, a wired device could also be used to send the information.

In addition, while the term "message" may have been used in the description of embodiments, the application may be applied to many types of networks and data. Furthermore, while certain types of connections, messages, and signaling may be depicted in exemplary embodiments, the application is not limited to a certain type of connection, message, and signaling.

Detailed herein is a method, system, and computer program product that allow for generating a channel level view of assets in a blockchain network while maintaining data integrity and trust among entities in the blockchain network itself. Continuing trust in the blockchain network is possible because, as discussed herein, care is taken to ensure each peer is able to maintain the blockchain/ledger despite a change in status.

In some embodiments, the method, system, and/or computer program product utilize a decentralized database (such as a blockchain) that is a distributed storage system, which includes multiple nodes that communicate with each other. The decentralized database includes an append-only immutable data structure resembling a distributed ledger capable of maintaining records between mutually untrusted parties. The untrusted parties are referred to herein as peers or peer nodes. Each peer maintains a copy of the database records and no single peer can modify the database records without a consensus being reached among the distributed peers. For example, the peers may execute a consensus protocol to validate blockchain storage transactions, group the storage transactions into blocks, and build a hash chain over the blocks. This process forms the ledger by ordering the storage transactions, as is necessary, for consistency.

In various embodiments, a permissioned and/or a permission-less blockchain can be used. In a public or permission-less blockchain, anyone can participate without a specific identity (e.g., retaining anonymity). Public blockchains can involve native cryptocurrency and use consensus based on various protocols such as Proof of Work. On the other hand, a permissioned blockchain database provides secure interactions among a group of entities which share a common goal, but which do not fully trust one another, such as businesses that exchange funds, goods, (private) information, and the like.

Further, in some embodiments, the method, system, and/or computer program product can utilize a blockchain that operates arbitrary, programmable logic, tailored to a decentralized storage scheme and referred to as "smart contracts" or "chaincodes." In some cases, specialized chaincodes may exist for management functions and parameters which are referred to as system chaincode. The method, system, and/or computer program product can further utilize smart contracts that are trusted distributed applications which leverage tamper-proof properties of the blockchain database and an underlying agreement between nodes, which is referred to as an endorsement or endorsement policy. Blockchain transactions associated with this application can be "endorsed"

before being committed to the blockchain while transactions, which are not endorsed, are disregarded.

An endorsement policy allows chaincode to specify endorsers for a transaction in the form of a set of peer nodes that are necessary for endorsement. When a client sends the transaction to the peers specified in the endorsement policy, the transaction is executed by the peers, which generate speculative transaction results. If enough peers to satisfy the endorsement policy produce identical execution results, the transaction is considered endorsed. After endorsement, the transactions enter an ordering phase in which a consensus protocol is used to produce an ordered sequence of endorsed transactions grouped into blocks. Traditionally used consensus protocols include first-in first-out (FIFO), and leader and follower protocols (e.g., Crash fault tolerance protocols).

In some embodiments, the method, system, and/or computer program product can utilize nodes that are the communication entities of the blockchain system. A "node" may perform a logical function in the sense that multiple nodes of different types can run on the same physical server. Nodes are grouped in trust domains and are associated with logical entities that control them in various ways. Nodes may include different types, such as a client or submitting-client node which submits a transaction-invocation to an endorser (e.g., peer), and broadcasts transaction-proposals to an ordering service (e.g., orderer node).

Another type of node is a peer node which can receive ordered client submitted transactions (e.g., from ordering service), commit the transactions and maintain a state and a copy of the ledger of blockchain transactions. Peers can also have the role of an endorser, although it is not a requirement. An ordering-service-node or orderer is a node running an ordering service, which receives a stream of endorsed transactions from clients and emits a stream of ordered transactions. An ordering service node runs a communication service for all peer nodes, and implements a delivery guarantee, such as a broadcast to each of the peer nodes in the system when committing/confirming transactions and modifying a world state of the blockchain, which is another name for the initial blockchain transaction which normally includes control and setup information.

In some embodiment, the method, system, and/or computer program product can utilize a ledger that is a sequenced, tamper-resistant record of all state transitions of a blockchain. State transitions may result from chaincode invocations (e.g., transactions) submitted by participating parties (e.g., client nodes, ordering nodes, endorser nodes, peer nodes, etc.). Each participating party (such as a peer node) can maintain a copy of the ledger. A transaction may result in a set of asset key-value pairs being committed to the ledger as one or more operands, such as creates, updates, deletes, and the like. The ledger includes a blockchain (also referred to as a chain) which is used to store an immutable, sequenced record in blocks. The ledger also includes a state database which maintains a current state of the blockchain.

In some embodiment, the method, system, and/or computer program product described herein can utilize a chain that is a transaction log that is structured as hash-linked blocks, and each block contains a sequence of N transactions where N is equal to or greater than one. The block header includes a hash of the block's transactions, as well as a hash of the prior block's header. In this way, all transactions on the ledger may be sequenced and cryptographically linked together. Accordingly, it is not possible to tamper with the ledger data without breaking the hash links. A hash of a most recently added blockchain block represents every transaction on the chain that has come before it, making it possible to ensure that all peer nodes are in a consistent and trusted state. The chain may be stored on a peer node file system (e.g., local, attached storage, cloud, etc.), efficiently supporting the append-only nature of the blockchain workload.

The current state of the immutable ledger represents the latest values for all keys that are included in the chain transaction log. Since the current state represents the latest key values known to a channel, it is sometimes referred to as a world state. Chaincode invocations execute transactions against the current state data of the ledger. To make these chaincode interactions efficient, the latest values of the keys may be stored in a state database. The state database may be simply an indexed view into the chain's transaction log, it can therefore be regenerated from the chain at any time. The state database may automatically be recovered (or generated if needed) upon peer node startup, and before transactions are accepted.

Blockchain is different from a traditional database in that blockchain is not a central storage, but rather a decentralized, immutable, and secure storage, where nodes may share in changes to records in the storage. Some properties that are inherent in blockchain and which help implement the blockchain include, but are not limited to, an immutable ledger, smart contracts, security, privacy, decentralization, consensus, endorsement, accessibility, and the like, which are further described herein. According to various aspects, the system described herein is implemented due to immutable accountability, security, privacy, permitted decentralization, availability of smart contracts, endorsements and accessibility that are inherent and unique to blockchain.

In particular, the blockchain ledger data is immutable and that provides for an efficient method for generating a channel level view of assets in a blockchain network. Also, use of the encryption in the blockchain provides security and builds trust. The smart contract manages the state of the asset to complete the life-cycle. The example blockchains are permission decentralized. Thus, each end user may have its own ledger copy to access. Multiple organizations (and peers) may be on-boarded on the blockchain network. The key organizations may serve as endorsing peers to validate the smart contract execution results, read-set and write-set.

One of the benefits of the example embodiments is that it improves the functionality of a computing system by implementing a method for generating a channel level view of assets in a blockchain network. Through the blockchain system described herein, computing system (or a processor in the computing system) can perform functionality for generating a channel level view of assets in a blockchain network received from one or more client applications utilizing blockchain networks by providing access to capabilities such as distributed ledger, peers, encryption technologies, MSP, event handling, etc. Also, the blockchain enables to create a business network and make any users or organizations to on-board for participation. As such, the blockchain is not just a database. The blockchain comes with capabilities to create a network of users and on-board/off-board organizations to collaborate and execute service processes in the form of smart contracts (which may be associated with one or more assets).

The example embodiments provide numerous benefits over a traditional database. For example, through the blockchain the embodiments provide for immutable accountability, security, privacy, permitted decentralization, availability of smart contracts, endorsements and accessibility that are inherent and unique to the blockchain.

A traditional database could not be used to implement the example embodiments because it does not bring all parties on the network, it does not create trusted collaboration, and does not provide for an efficient storage of assets. The traditional database does not provide for a tamper proof storage and cannot provide for generating a channel level view of assets in a blockchain network. As a result, the proposed embodiments described herein utilizing blockchain networks cannot be implemented in the traditional database.

If a traditional database were to be used to implement the example embodiments, the example embodiments would have suffered from unnecessary drawbacks such as search capability, lack of security and slow speed of transactions. Accordingly, the example embodiments provide for a specific solution to a problem in the arts/field of generating a channel level view of assets in a blockchain network.

Turning now to FIG. 1A, illustrated is a blockchain architecture 100, in accordance with embodiments of the present disclosure. In some embodiments, the blockchain architecture 100 may include certain blockchain elements, for example, a group of blockchain nodes 102. The blockchain nodes 102 may include one or more blockchain nodes, e.g., peers 104-110 (these four nodes are depicted by example only). These nodes participate in a number of activities, such as a blockchain transaction addition and validation process (consensus). One or more of the peers 104-110 may endorse and/or recommend transactions based on an endorsement policy and may provide an ordering service for all blockchain nodes 102 in the blockchain architecture 100. A blockchain node may initiate a blockchain authentication and seek to write to a blockchain immutable ledger stored in blockchain layer 116, a copy of which may also be stored on the underpinning physical infrastructure 114. The blockchain configuration may include one or more applications 124 which are linked to application programming interfaces (APIs) 122 to access and execute stored program/application code 120 (e.g., chaincode, smart contracts, etc.) which can be created according to a customized configuration sought by participants and can maintain their own state, control their own assets, and receive external information. This can be deployed as a transaction and installed, via appending to the distributed ledger, on all blockchain nodes 104-110.

The blockchain base or platform 112 may include various layers of blockchain data, services (e.g., cryptographic trust services, virtual execution environment, etc.), and underpinning physical computer infrastructure that may be used to receive and store new transactions and provide access to auditors which are seeking to access data entries. The blockchain layer 116 may expose an interface that provides access to the virtual execution environment necessary to process the program code and engage the physical infrastructure 114. Cryptographic trust services 118 may be used to verify transactions such as asset exchange transactions and keep information private.

The blockchain architecture 100 of FIG. 1A may process and execute program/application code 120 via one or more interfaces exposed, and services provided, by blockchain platform 112. The code 120 may control blockchain assets. For example, the code 120 can store and transfer data, and may be executed by peers 104-110 in the form of a smart contract and associated chaincode with conditions or other code elements subject to its execution. As a non-limiting example, smart contracts may be created to execute the transfer of resources, the generation of resources, etc. The smart contracts can themselves be used to identify rules associated with authorization and access requirements and usage of the ledger. For example, the channel information/ channel data set 126 may be processed by one or more processing entities (e.g., virtual machines) included in the blockchain layer 116. The result 128 may include a plurality of linked shared documents (e.g., with each linked shared document recording the issuance of a smart contract in regard to the channel information/channel data set 126, etc.). The physical infrastructure 114 may be utilized to retrieve any of the data or information described herein.

A smart contract may be created via a high-level application and programming language, and then written to a block in the blockchain. The smart contract may include executable code which is registered, stored, and/or replicated with a blockchain (e.g., distributed network of blockchain peers). A transaction is an execution of the smart contract code which can be performed in response to conditions associated with the smart contract being satisfied. The executing of the smart contract may trigger a trusted modification(s) to a state of a digital blockchain ledger. The modification(s) to the blockchain ledger caused by the smart contract execution may be automatically replicated throughout the distributed network of blockchain peers through one or more consensus protocols.

The smart contract may write data to the blockchain in the format of key-value pairs. Furthermore, the smart contract code can read the values stored in a blockchain and use them in application operations. The smart contract code can write the output of various logic operations into the blockchain. The code may be used to create a temporary data structure in a virtual machine or other computing platform. Data written to the blockchain can be public and/or can be encrypted and maintained as private. The temporary data that is used/generated by the smart contract is held in memory by the supplied execution environment, then deleted once the data needed for the blockchain is identified.

A chaincode may include the code interpretation of a smart contract, with additional features. As described herein, the chaincode may be program code deployed on a computing network, where it is executed and validated by chain validators together during a consensus process. The chaincode receives a hash and retrieves from the blockchain a hash associated with the data template created by use of a previously stored feature extractor. If the hashes of the hash identifier and the hash created from the stored identifier template data match, then the chaincode sends an authorization key to the requested service. The chaincode may write to the blockchain data associated with the cryptographic details (e.g., thus confirming the group of transactions, identifying a conflict between one or more of the transactions in the group of transactions, etc.).

Figure 1B:
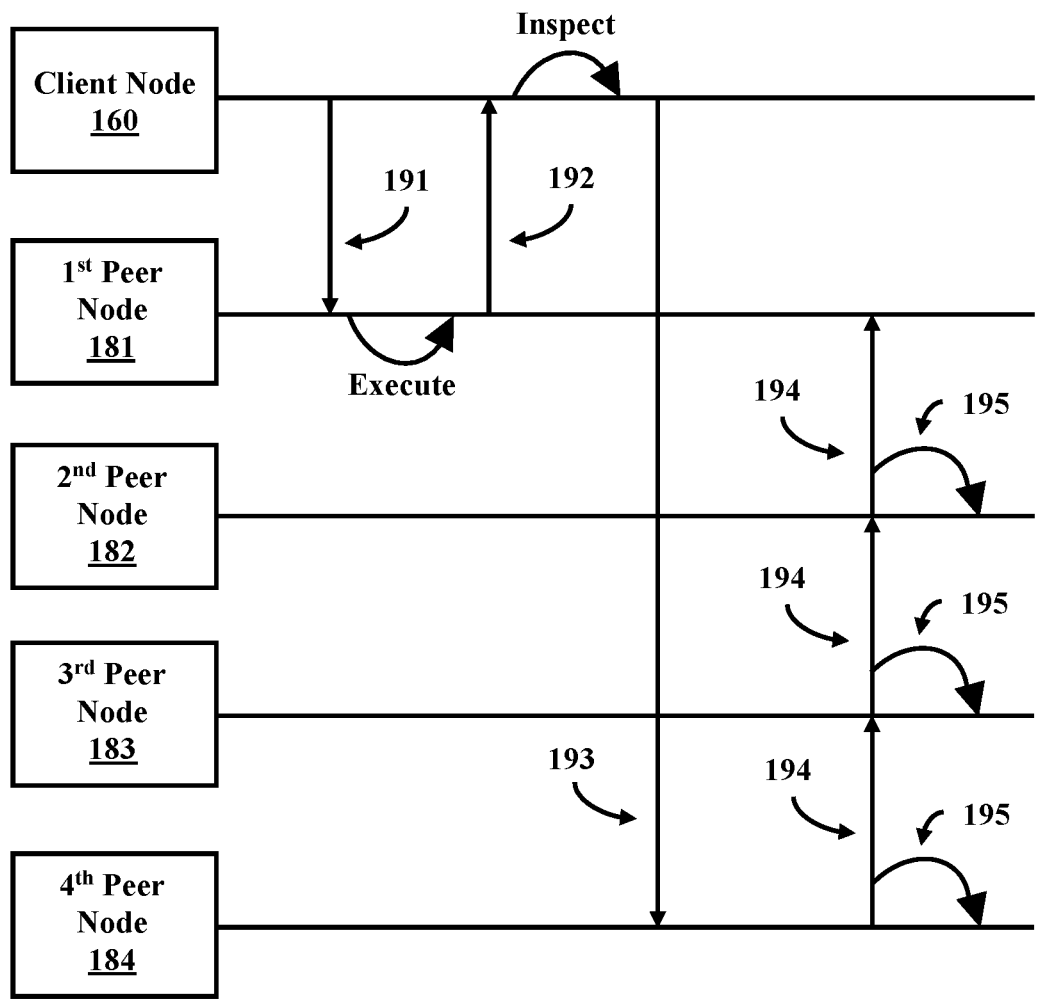
FIG. 1B illustrates a blockchain transactional flow, in accordance with embodiments of the present disclosure.

FIG. 1B illustrates an example of a conventional blockchain transactional flow 150 between nodes of the blockchain in accordance with an example embodiment. Referring to FIG. 1B, the transaction flow may include a transaction proposal 191 sent by an application client node 160 to one or more endorsing peer nodes 181 (e.g., in some embodiments, the transaction proposal 191 may be a transaction verification request and/or a conflict verification request). The endorsing peer 181 may verify the client signature and execute a chaincode function to initiate the transaction. The output may include the chaincode results, a set of key/value versions that were read in the chaincode (read set), and the set of keys/values that were written in chaincode (write set). The proposal response 192 is sent back to the client 160 along with an endorsement signature, if approved. The client 160 assembles the endorsements into a transaction payload 193 and broadcasts it to an ordering service node 184. The ordering service node 184 then delivers ordered transactions as blocks to all peers 181-183 on a channel. Before committal to the blockchain, each peer 181-183 may validate the transaction. For example, the peers may check the endorsement policy to ensure that the correct allotment of the specified peers have signed the results and authenticated the signatures against the transaction payload 193.

Referring again to FIG. 1B, the client node 160 initiates the transaction 191 by constructing and sending a request to the peer node 181, which is an endorser. The client 160 may include an application leveraging a supported software development kit (SDK), which utilizes an available API to generate a transaction proposal 191. The proposal is a request to invoke a chaincode function so that data can be read and/or written to the ledger (e.g., write new key value pairs for the assets). The SDK may reduce the package of the transaction proposal 191 into a properly architected format (e.g., protocol buffer over a remote procedure call (RPC)) and take the client's cryptographic credentials to produce a unique signature for the transaction proposal 191.

In response, the endorsing peer node 181 may verify (a) that the transaction proposal 191 is well formed, (b) the transaction has not been submitted already in the past (replay-attack protection), (c) the signature is valid, and (d) that the submitter (client 160, in the example) is properly authorized to perform the proposed operation on that channel. The endorsing peer node 181 may take the transaction proposal 191 inputs as arguments to the invoked chaincode function. The chaincode is then executed against a current state database to produce transaction results including a response value, read-set, and write-set. However, no updates are made to the ledger at this point. In some embodiments, the set of values, along with the endorsing peer node's 181 signature is passed back as a proposal response 192 to the SDK of the client 160 which parses the payload for the application to consume.

In response, the application of the client 160 inspects/verifies the endorsing peers' signatures and compares the proposal responses to determine if the proposal response is the same. If the chaincode only queried the ledger, the application would inspect the query response and would typically not submit the transaction to the ordering node service 184. If the client application intends to submit the transaction to the ordering node service 184 to update the ledger, the application determines if the specified endorsement policy has been fulfilled before submitting (e.g., has a transaction verification request been accepted). Here, the client may include only one of multiple parties to the transaction. In this case, each client may have their own endorsing node, and each endorsing node will need to endorse the transaction. The architecture is such that even if an application selects not to inspect responses or otherwise forwards an unendorsed transaction, the endorsement policy will still be enforced by peers and upheld at the commit validation phase.

After successful inspection, in step 193 the client 160 assembles endorsements into a transaction and broadcasts the transaction proposal 191 and response within a transaction message to the ordering node 184. The transaction may contain the read/write sets, the endorsing peers' signatures and a channel ID. The ordering node 184 does not need to inspect the entire content of a transaction in order to perform its operation, instead the ordering node 184 may simply receive transactions from all channels in the network, order them by channel, and create blocks of transactions per channel.

The blocks of the transaction are delivered from the ordering node 184 to all peer nodes 181-183 on the channel. The transactions 194 within the block are validated to ensure any endorsement policy is fulfilled and to ensure that there have been no changes to ledger state for read set variables since the read set was generated by the transaction execution. Transactions in the block are tagged as being valid or invalid. Furthermore, in step 195 each peer node 181-183 appends the block to the channel's chain, and for each valid transaction the write sets are committed to current state database. An event is emitted, to notify the client application that the transaction (invocation) has been immutably appended to the chain, as well as to notify whether the transaction was validated or invalidated. Validated transaction and their associated values update the blockchain ledger, while invalidated transactions are committed but the invalidated transaction values do not update the blockchain ledger.

Figure 2:
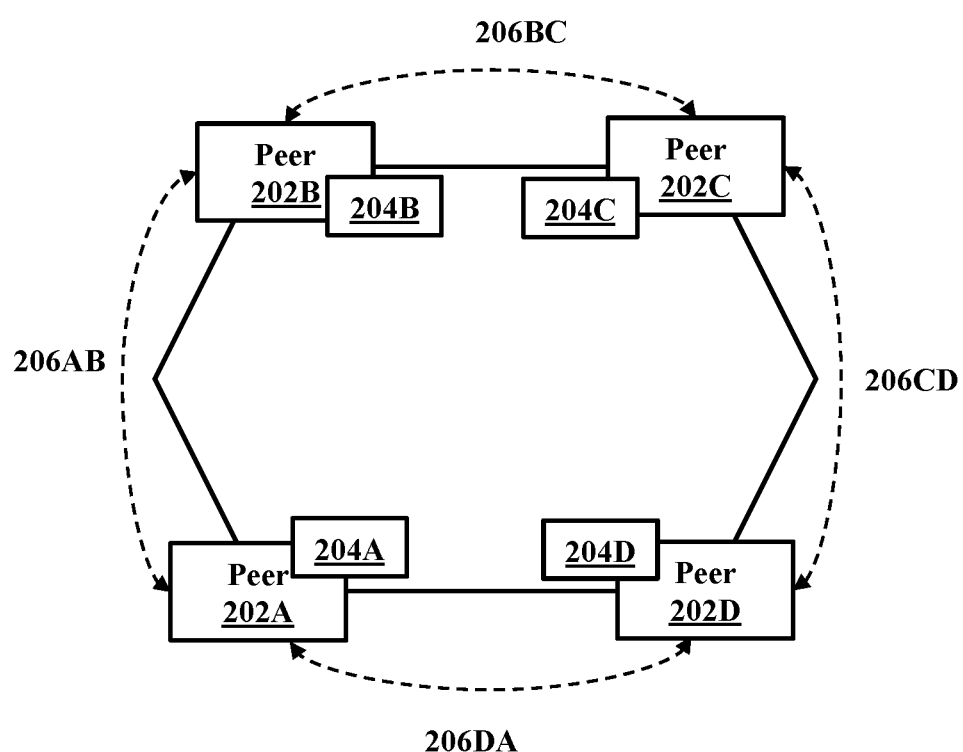
FIG. 2 depicts an example blockchain network configured to generate a channel level view of assets in a blockchain network, in accordance with embodiments of the present disclosure.

Turning to FIG. 2, illustrated is an example blockchain network 200 generating a channel level view of assets in the blockchain network 200, in accordance with embodiments of the present disclosure. While embodiments disclosed herein often refer to the blockchain network 200 as a permissioned blockchain consortium (e.g., Hyperledger Fabric blockchain network), blockchain network 200 can be configured to work within any type of blockchain consortium (e.g., permissionless blockchain) having peer nodes or nodes providing similar role functions. For example, embodiments disclosed herein can be implemented in blockchain consortiums including, but not limited to those configurations observed in Bitcoin®, Ethereum®, and Hyperledger®. In embodiments, blockchain network 200 can include one or more blockchain entities (e.g., an organization, etc.) having one or more peers 202A-D configured to perform blockchain functions. While FIG. 2 depicts only four different peers (e.g., one or more peers 202A-D), blockchain network 200 can include any number or configuration of peers.

As discussed herein, each of the one or more entities of the blockchain network 200 can include one or more peer nodes 202A-D (e.g., herein after referred to as peers) that may be configured to provide one or more roles in blockchain network 200. These roles include, but are not limited to endorsing (e.g., endorsers) and committing (e.g., committers). While in some embodiments, one or more peers 202A-D may include all of the peers in blockchain network 200, in other embodiments, one or more peers 202A-D may refer to the peers in/of a particular blockchain entity. Blockchain network 200 may include one or more blockchain entities (not shown) that include the one or more peers 202A-D.

In embodiments, blockchain network 200 can include an asset collective modules 204A-D. While in some embodiments the asset collective modules 204A-D can be configured to be a single module within blockchain network 200 capable of interacting with one or more peers 202A-D, in other embodiments, asset collective modules 204A-D may be integrated within each of the one or more peers 202A-D, respectively. Hereinafter, asset collective module 204A-D will be generally discussed in context of asset collective module 204A. Asset collective modules 204B, 204C, and 204D may be configured in any manner discussed in reference to asset collective module 204A. While in some embodiments, one or more asset collective modules 204A-D are similarly configured, in other embodiments each asset collective modules 204A, 204B, 204C, and 204D is differently configured. In embodiments, where asset collective module 204A is incorporated or housed in the peer 202A, asset collective module 204A may be incorporated into the peer 202A in a variety of ways including, but not limited to, as a part of peer code deployment (e.g., for Hyperledger Fabric), a system level chain code (e.g., for Ethereum), or part of an EVM execution framework (e.g., for Bitcoin). In embodiments, asset collective module 204A-D can be configured to act as a participant in a channel (e.g., channels 206AB, 206BC, 206CD, and 206DA). By acting as a participant of the channel allows asset collective module 204A-D to have access to channel specific information.

In some embodiments, asset collective module 204A may have access to different channel specific information, depending on the blockchain consortium implemented. For example, if blockchain network 200 is configured to resemble Bitcoin® or Ethereum® the asset collective module 204A can collect channel information from associated with the one or more locked assets to generate a channel (e.g., MSB for Bitcoin® and Enterprise for Ethereum®) specific view of the locked asset (e.g., a channel level view of assets). If blockchain network 200 is configured in a Hyperledger fabric architecture, asset collective module 204A may collect channel information associated with one or more assets confined to the channel to generate a channel (e.g., state channel) specific view of the locked asset (e.g., a channel level view of assets).

As contemplated herein, asset collective module 204A can be configured to generate a channel level view of assets in blockchain network 200. As depicted in FIG. 2, channel 206AB, is the channel linking peer 202A to peer 202B. In embodiments, and as contemplated herein, channels, such as channel 206AB, is a subset of blockchain network 200 that can be used to minimize processing transaction loads and reduce corresponding processing delays associated with processing and committing large batches of transactions to the main blockchain ledger in blockchain network 200. Channels, such as channel 206AB, can provide a layer of communication between peer 202A and peer 202B that is not directly connected to the main blockchain ledger.

In embodiments, channel 206AB can allow peer 202A and peer 202B to process transactions among each other in channel 206AB independent of the main blockchain ledger. Depending on the blockchain consortium (e.g., Hyperledger or Ethereum), peer 202A and peer 202B may agree to lock one or more assets or confine one or more assets to channel 206AB. In these embodiments, an asset is locked in channel 206AB until the peer 202A and peer 202B have completed transacting. Once peer 202A and peer 202B's transacting in channel 206AB is complete, the final version of the one or more assets is processed and committed to the main blockchain ledger. This attempts to ensure a valid accounting of one or more assets that were updated "off chain" when those one or more assets are configured into the main blockchain ledger. In embodiments, the one or more assets confined/locked to channel 206AB may receive their initial values from the main blockchain ledger. In these embodiments, each of the one or more assets can be identified and differentiated from other assets by identifiers. An identifier can include but is not limited to one or more alphanumeric hashes and/or a descriptor that may have a short asset description of the asset (e.g., for Hyperledger architecture). In some embodiments, a descriptor may include not only a short description of the asset, but also what entity issued the asset and what the asset represents. While only two peers (e.g., peer 202A and peer 202B) are depicted FIG. 2 as participating in channel 206AB, any number of peers may be configured to participate in channel 206AB.

As discussed herein, the one or more assets are confined/locked within channel 206AB as an attempt to control and minimize potential inaccuracies that could, at a later time, be incorporated into the main blockchain ledger. For example, if the one or more assets in channel 206AB are not locked/confined, then those assets could be removed from channel 206AB and altered or updated in a variety of ways that are not ultimately incorporated in the main blockchain ledger. While potential inaccuracies are unlikely to occur for a channel containing one or more assets locked while a few transactions were processed, the possibility for potential inaccuracies as well as the potential for malicious activity may increase when thousands or hundreds of thousands of transactions are processed between peer 202A and peer 202B in channel 206AB having locked/confined one or more assets. While in some embodiments, peer 202A and peer 202B may create a separate ledger to maintain a state record of the one or more assets, in other embodiments peer 202A and peer 202B may only maintain a current state associated with each of the one or more asset locked/confined in the channel 206AB.

As such, often the records of transactions and state updates associated with the one or more assets in channel 206AB are only viewable or known to peer 202A and peer 202B. Such records of transactions and state updates are typically obscured from other entities and participants (e.g., peers 202C and 202D) in blockchain network 200. Because of this affect resulting from the use of channels (e.g., channel 206AB), blockchain network 200 may be unable to provide auditing functions or necessary governing or regulatory activities required to maintain trust in the blockchain ledger. If blockchain network 200 is only partially or completely incapable of running one or more of the aforementioned functions or any other functions related to those concerns, it is possible that blockchain network 200 may, at some point, have some form of malicious activity occur and not be able to detect it. As such, it is important to mitigate the possibility of malicious activity and loss of trust in the main blockchain ledger by increasing the viewability of the transaction record between peer 202A and peer 202B associated with the one or more assets locked/confined in channel 206AB.

In one example embodiment, asset collective module 204A can be housed/incorporated as a component of peer 202A (e.g., first peer) and configured to collect a channel data set (e.g., first data set). In embodiments, asset collective module 204A can initiate a periodic sweep of peer 202A. In these embodiments, asset collective module 204A can include a variety of ways in which the periodic sweep is initialized, such as a configured option, manually triggered, systematically devised, or a combination thereof. In some embodiments, peer 202A could configure an option by arranging asset collective module 204A to perform a periodic sweep after every $100^{th}$ transaction that occurs within a particular channel (e.g., channel 206AB). In some embodiments, peer 202A could manually trigger asset collective module 204A to perform a periodic sweep when peer 202A desires an asset inventory of the one or more assets locked/confined within a particular channel. In some embodiments, peer 202A could systemically devise asset collective module 204A to initiating a periodic sweep after every block is processed. While in some of these embodiments, processing a block could refer to blocks added to the main blockchain ledger, in other embodiments, processing a block could refer to blocks processes as part of the sub-blockchain generated as part of a particular channel.

In embodiments, the periodic sweep may collect channel information associated with the peer 202A (e.g., first peer).

In some embodiments, channel information can include any type of information regarding each of the one or more channels peer 202A might be participating in. In embodiments a map-reduce function can be initiated by asset collective module 204A. While in some embodiments, the map-reduce function is initiated at the same time as the periodic sweep, in other embodiments, the asset collective module 204A uses channel information and a map-reduce function is initiated/performed on every channel.

In embodiments, a map-reduce function may analyze channel data to provide channel data sets including, but not limited to, using channel information to identify each of the one or more channels peer 202A might be participating with in a channel (e.g., 206AB, 206BC, 206CD, 206DA), what entity or entities are participating in a particular channel, the one or more assets that are locked/confined in the particular channel, as well as the state information regarding the one or more assets (e.g., first data set). For example, using the example embodiment depicted in FIG. 2, if a periodic sweep and map-reduce function were initiated on peer 202A, the channel data set (e.g., first data set) may include data/information indicating that peer 202A is participating in channel 206AB with peer 202B and channel 206AD with peer 202D. While FIG. 2 does not depict one or more assets associated with the various channels, if it did, the channel data set could also include the one or more assets locked/confined in each channel as well. In embodiments, the results associated with the periodic sweep and/or the map-reduce function may be recorded within peer 202A. While contemplated herein, peers (e.g., peers 202A-D) can participate in any number of channels, including bilateral and multilateral channels.

In embodiments, asset collective module 204A can analyze the channel data sets of the map-reduce function (e.g., channel data sets) and determined a channel specific inventory. The channel specific inventory may include information regarding the one or more assets locked/confined in the particular channel and data regarding the various state changes. More particularly. While in some embodiments, the channel specific inventory may be recorded and stored within a storage space in peer 202A, in other embodiments, the channel specific inventory is stored in a separate database. Storing the channel specific inventory in a separate database can allow the data to be easily accessible for data intensive purposes (e.g., analytics) and business functions (e.g., reconciliation and business asset monitoring). Storing the channel specific inventory can allow for peer 202A to have its own level of asset visibility at the channel level while contributing to asset visibility in channels for those entities participating in blockchain network 200 (e.g., for regulators, and/or operators).

In embodiments, asset collective module 204A can analyze and/or aggregate the channel data sets (e.g., aggregate each of the channel specific inventories) associated with each of the one or more channels to generate an aggregated asset inventory. The aggregated asset inventory be determined at peer 202A's and include all of the one or more assets associated with all of the channels peer 202A is participating in. A status may include, but is not limited to, unresolved block processing (e.g., the transaction has yet been committed), and the determined current state of the one or more asset locked/confined in a particular channel (e.g., first channel). In embodiments, a status can be assigned to each of the one or more assets aggregated in the aggregated asset inventory. (e.g., first channel). In embodiments, asset collective module 204A can provide the status of each of the one or more assets aggregated in the aggregated asset inventory associated with peer 202A (e.g., the first peer) in a viewable channel. The viewable channel can be configured to provide the status information associated with peer 202A (e.g., first peer) to a channel that is accessible to the one or more entities participating in the blockchain network 200.

In embodiments, asset collective module 204A can verify the status of the one or more assets of a particular channel (e.g., channel 206AB) determined by the peer 202A (e.g., asset collective module 204A housed/incorporated within peer 202A). In embodiments, asset collective module 204A can compare the status (e.g., first status) of the one or more assets aggregated in the aggregated asset inventory, determined by peer 202A (e.g., first peer), to a second status. In embodiments, the second status can be configured using asset collection module 204B housed/incorporated within peer 202B (e.g., determined by the second peer) to determine the proper status associated with the one or more assets aggregated in the aggregated asset inventory compiled and analyzed by peer 202B. In these embodiments, asset collective module 204A is comparing the status and the second status of the same one or more assets that was locked/confined in channel 206AB that was used to allow peer 202A and peer 202B to exchange transactions. This can be confirmed by comparing the asset identifier in the record of aggregate asset inventory. While in some embodiments, asset collective module 204A is configured to read the second status of peer 202B (e.g., second peer) from the viewable channel, in other embodiments, asset collective module 204A requests and receives the second status from peer 202B.

In embodiments, asset collective module 204A can compare the same status to the second status to determine if there is a consensus regarding the state of the one or more assets. For example, if the current state of the status (e.g., value or version) determined by peer 202A is different than the second state determined by peer 202B, there may be/is a dispute between peer 202A and peer 202B. In some embodiments, when a dispute of the status of the one or more assets is identified, the one or more disputed assets with be locked until the state of the asset can be reconciled. In embodiments, additional analyses may be necessary to resolve discrepancies associated with disputed assets, assets with missing information (e.g., an asset has an unknown state, but ownership is known), and/or assets that are considered locked/transient for one or more other reasons. These additional analyses may include, mapping the locked/transient asset to channel specific inventory to identify one or more objects (e.g., transactions) associated with channel use that could have initiated the error. In embodiments where the status and the second status are the same, the one or more assets are said to be reconciled.

In embodiments, any results received during verifying the status of one or more assets can be provided to the viewable channel in blockchain network 200. In embodiments, results received during verification may include, but are not limited to, providing information regarding asset dispute reconciliation, and the inability to resolve an asset dispute. In embodiments, once data associated with the one or more assets is compiled into the aggregated asset inventory, the herein discussed method may be configured to continue until all assets are accounted for (e.g., reconciled) or assets are locked until the dispute can be arbitrated. All generate information can be incorporated in the viewable channel wherein entities of blockchain network 200 can observe the data and use the data in the viewable channel to perform various blockchain functions, such as auditor, operator, and/or regulator.

Figure 3:
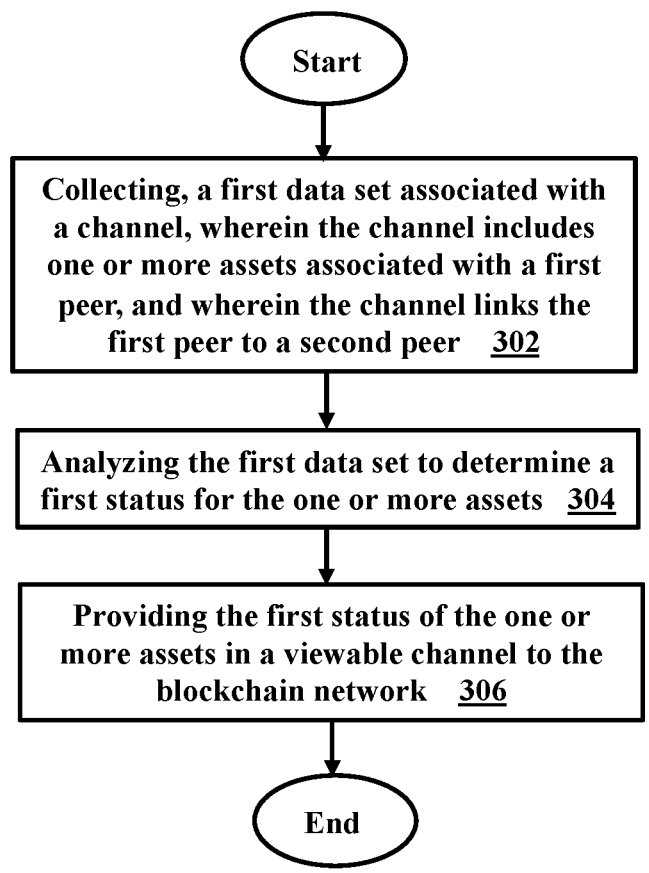
FIG. 3 illustrates a flowchart of an example method for generating a channel level view of assets in a blockchain network, in accordance with embodiments of the present disclosure.

Referring now to FIG. 3, a flowchart illustrating an example method 300 for providing a channel level view of assets in a blockchain network, in accordance with embodiments of the present disclosure. In some embodiments, the method 300 may be performed by one or more peer nodes within the blockchain network (e.g., blockchain network 200). In some embodiments, the method 300 begins at operation 302. At operation 302, where the processor collects a first data set, from a first peer, associated with a channel having one or more channel assets. In embodiments, the first channel may be configured to link the first peer to a second peer. In some embodiments, the method 300 proceeds to operation 304. At operation 304, the processor analyzes the first data set to determine a first status for the one or more channel assets in the first channel. In some embodiments, the method 300 proceeds to operation 306. At operation 306, the processor provides the first status of the one or more channel assets determined at the first peer in a viewable channel to the blockchain network. In some embodiments, as depicted, after operation 306, method 300 may end.

In embodiments, where the first peer is collecting the first data set associated with the first channel having the one or more channel assets, the processor may initiate, at the first peer, a periodic sweep of the one or more other channels associated with the first peer. In these embodiments, the one or more other channels may include the first channel. In some embodiments, the processor may receive channel information from the one or more other channels from the periodic sweep. In some embodiments, the processor may perform a map-reduce function on the channel information. In these embodiments, the processor may determine the first data set, associated with the one or more channel assets in the first channel.

In embodiments, where the first data set is collected from the first peer associated with the first channel having the one or more channel assets, the processor may initiate a periodic sweep of one or more channels associated with the first peer. In these embodiments, the first channel may be included in the one or more channels. In some embodiments, the processor may receive channel information from the periodic sweep associated with the one or more channels. In some embodiments, the processor may perform a map-reduce function on the channel information. In these embodiments, using the map-reduce function, the processor may determine the first data set is associated with the first channel and the one or more channel assets in the first channel.

In embodiments, where the first data set is collected from the first peer associated with the first channel having the one or more channel assets, the processor may initiate a periodic sweep of one or more channels associated with the first peer. In these embodiments, the first channel may be included in the one or more channels. In some embodiments, the processor may receive channel information from the one or more channels from the periodic sweep. In some embodiments, the processor may perform a map-reduce function on the channel information to determine a channel data set associated with each of the one or more channels, wherein the first data set is the channel data set associated with the first channel. In these embodiments, the processor may aggregate the channel data sets associated with each of the one or more channels and the channel to generate an asset inventory.

In embodiments, the processor may verify the first status of the one or more channel assets of the first channel determined by the first peer. In some embodiments, the processor may read, from the viewable channel, a second status of the one or more channel assets of the first channel determined at the second peer. Alternatively, in some embodiments, the processor may receive the second status of the one or more channel assets of the first channel from the second peer. In some embodiments, the processor may compare the first status of the one or more channel assets, determined by the first peer, to the second status of the one or more channel assets, determined by the second peer. In some embodiments, the processor may provide the results of the comparison to the viewable channel in the blockchain network (e.g., blockchain network 200).

It is to be understood that although this disclosure includes a detailed description on cloud computing, implementation of the teachings recited herein are not limited to a cloud computing environment. Rather, embodiments of the present disclosure are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of portion independence in that the consumer generally has no control or knowledge over the exact portion of the provided resources but may be able to specify portion at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an entity. It may be managed by the entity or a third party and may exist on-premises or off-premises.

Community cloud: the cloud infrastructure is shared by several entities and supports a specific community that has shared concerns (e.g., mission, security requirements, policy, and compliance considerations). It may be managed by the entities or a third party and may exist on-premises or off-premises.

Public cloud: the cloud infrastructure is made available to the general public or a large industry group and is owned by an entity selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 4A:
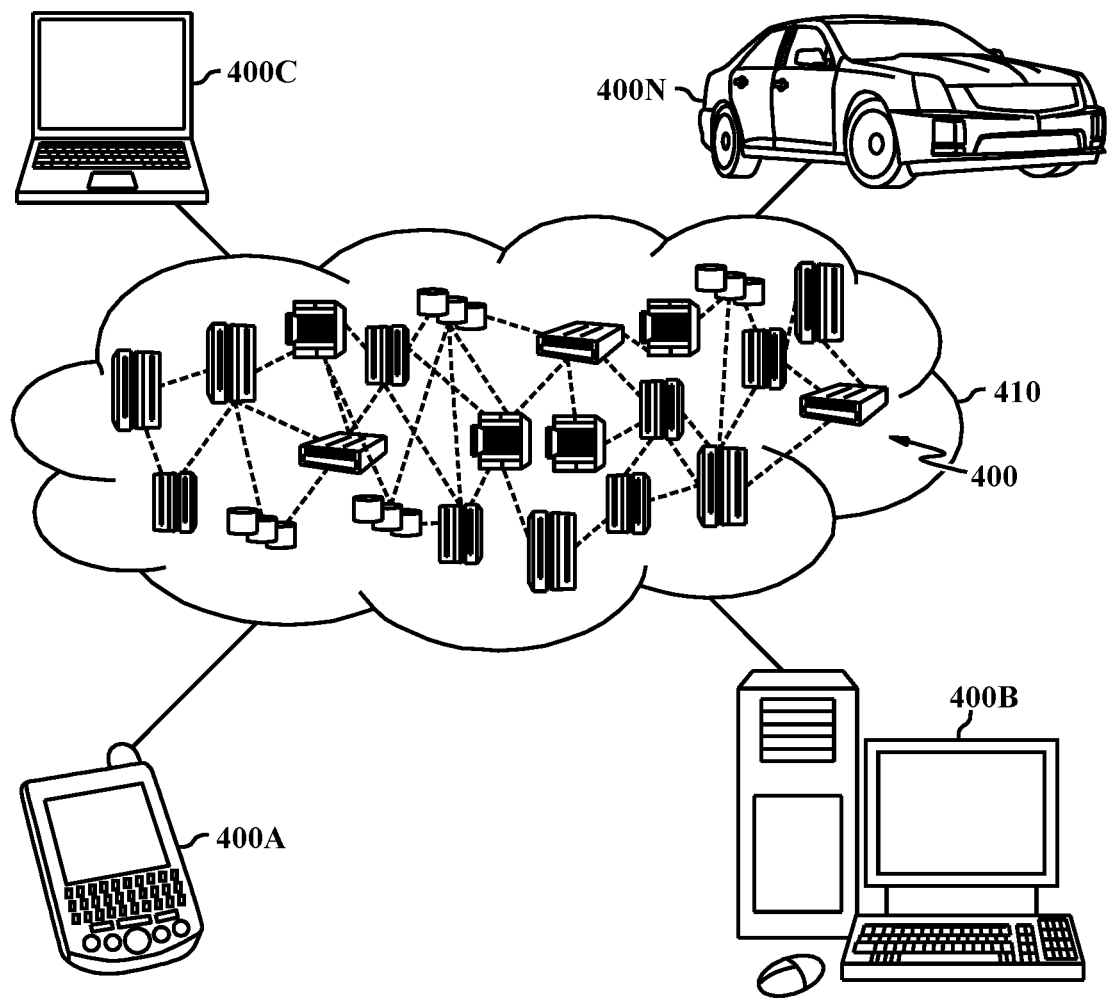
FIG. 4A illustrates a cloud computing environment, in accordance with embodiments of the present disclosure.

FIG. 4A, illustrated is a cloud computing environment 410 is depicted. As shown, cloud computing environment 410 includes one or more cloud computing nodes 400 with which local computing devices used by cloud consumers, such as, for example, personal digital assistant (PDA) or cellular telephone 400A, desktop computer 400B, laptop computer 400C, and/or automobile computer system 400N may communicate. Nodes 400 may communicate with one another. They may be grouped (not shown) physically or virtually, in one or more networks, such as Private, Community, Public, or Hybrid clouds as described hereinabove, or a combination thereof.

This allows cloud computing environment 410 to offer infrastructure, platforms and/or software as services for which a cloud consumer does not need to maintain resources on a local computing device. It is understood that the types of computing devices 400A-N shown in FIG. 4A are intended to be illustrative only and that computing nodes 400 and cloud computing environment 410 can communicate with any type of computerized device over any type of network and/or network addressable connection (e.g., using a web browser).

Figure 4B:
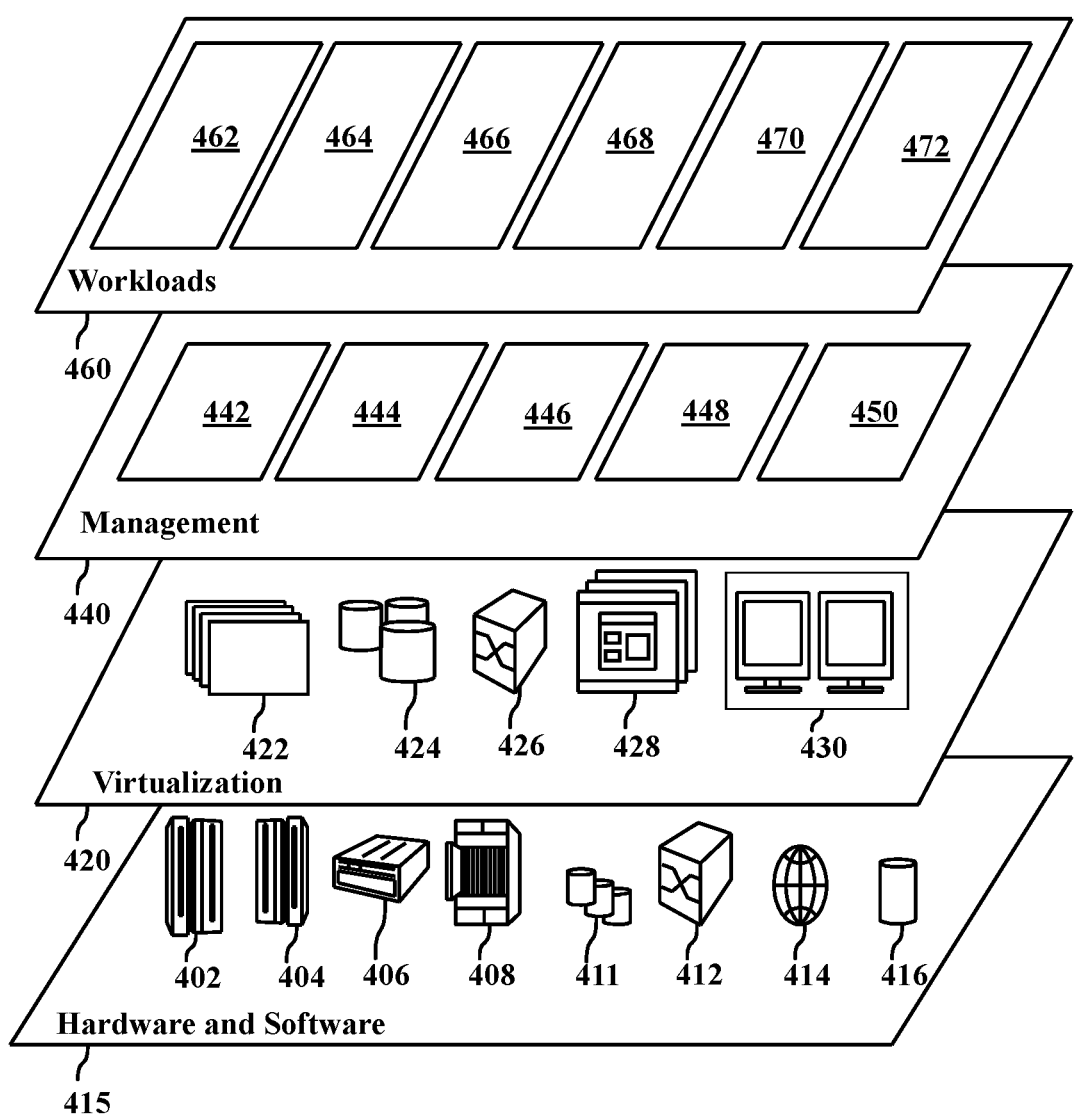
FIG. 4B illustrates abstraction model layers, in accordance with embodiments of the present disclosure.

FIG. 4B, illustrated is a set of functional abstraction layers provided by cloud computing environment 410 (FIG. 4A) is shown. It should be understood in advance that the components, layers, and functions shown in FIG. 4B are intended to be illustrative only and embodiments of the disclosure are not limited thereto. As depicted below, the following layers and corresponding functions are provided.

Hardware and software layer 415 includes hardware and software components. Examples of hardware components include: mainframes 402; RISC (Reduced Instruction Set Computer) architecture based servers 404; servers 406; blade servers 408; storage devices 411; and networks and networking components 412. In some embodiments, software components include network application server software 414 and database software 416.

Virtualization layer 420 provides an abstraction layer from which the following examples of virtual entities may be provided: virtual servers 422; virtual storage 424; virtual networks 426, including virtual private networks; virtual applications and operating systems 428; and virtual clients 430.

In one example, management layer 440 may provide the functions described below. Resource provisioning 442 provides dynamic procurement of computing resources and other resources that are utilized to perform tasks within the cloud computing environment. Metering and Pricing 444 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 446 provides access to the cloud computing environment for consumers and system administrators. Service level management 448 provides cloud computing resource allocation and management such that required service levels are met. Service Level Agreement (SLA) planning and fulfillment 450 provide pre-arrangement for, and procurement of, cloud computing resources for which a future requirement is anticipated in accordance with an SLA.

Workloads layer 460 provides examples of functionality for which the cloud computing environment may be utilized. Examples of workloads and functions which may be provided from this layer include: mapping and navigation 462; software development and lifecycle management 464; virtual classroom education delivery 466; data analytics processing 468; transaction processing 470; and for generating a channel level view of assets in a blockchain network 472.

Figure 5:
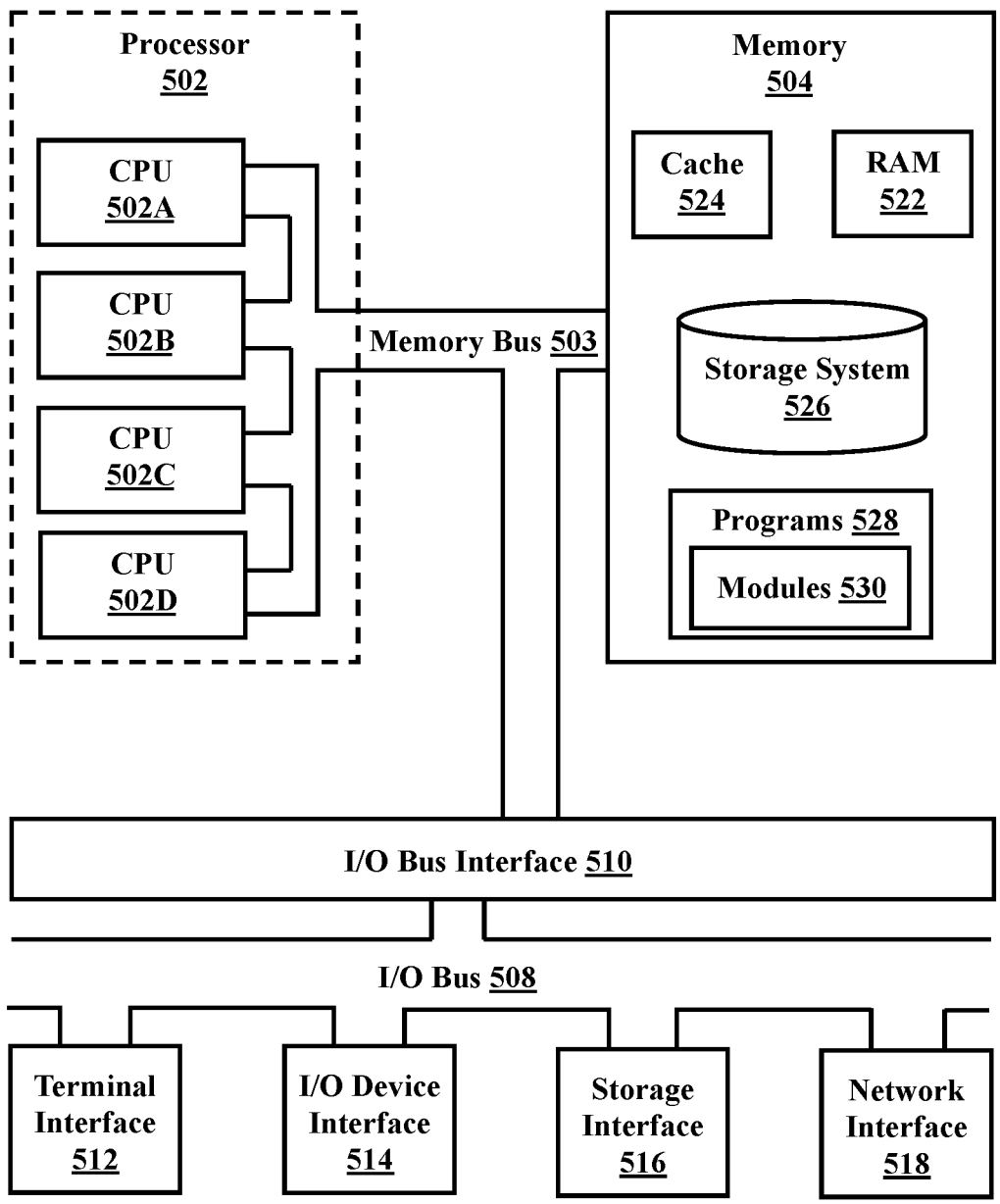
FIG. 5 illustrates a high-level block diagram of an example computer system that may be used in implementing one or more of the methods, tools, and modules, and any related functions, described herein, in accordance with embodiments of the present disclosure.

FIG. 5, illustrated is a high-level block diagram of an example computer system 501 that may be used in implementing one or more of the methods, tools, and modules, and any related functions, described herein (e.g., using one or more processor circuits or computer processors of the computer), in accordance with embodiments of the present disclosure. In some embodiments, the major components of the computer system 501 may comprise one or more CPUs 502, a memory subsystem 504, a terminal interface 512, a storage interface 516, an I/O (Input/Output) device interface 514, and a network interface 518, all of which may be communicatively coupled, directly or indirectly, for inter-component communication via a memory bus 503, an I/O bus 508, and an I/O bus interface unit 510.

The computer system 501 may contain one or more general-purpose programmable central processing units (CPUs) 502A, 502B, 502C, and 502D, herein generically referred to as the CPU 502. In some embodiments, the computer system 501 may contain multiple processors typical of a relatively large system; however, in other embodiments the computer system 501 may alternatively be a single CPU system. Each CPU 502 may execute instructions stored in the memory subsystem 504 and may include one or more levels of on-board cache.

System memory 504 may include computer system readable media in the form of volatile memory, such as random access memory (RAM) 522 or cache memory 524. Computer system 501 may further include other removable/non-removable, volatile/non-volatile computer system storage media. By way of example only, storage system 526 can be provided for reading from and writing to a non-removable, non-volatile magnetic media, such as a "hard drive." Although not shown, a magnetic disk drive for reading from and writing to a removable, non-volatile magnetic disk (e.g., a "floppy disk"), or an optical disk drive for reading from or writing to a removable, non-volatile optical disc such as a CD-ROM, DVD-ROM or other optical media can be provided. In addition, memory 504 can include flash memory, e.g., a flash memory stick drive or a flash drive. Memory devices can be connected to memory bus 503 by one or more data media interfaces. The memory 504 may include at least one program product having a set (e.g., at least one) of program modules that are configured to carry out the functions of various embodiments.

One or more programs/utilities 528, each having at least one set of program modules 530 may be stored in memory 504. The programs/utilities 528 may include a hypervisor (also referred to as a virtual machine monitor), one or more operating systems, one or more application programs, other program modules, and program data. Each of the operating systems, one or more application programs, other program modules, and program data or some combination thereof, may include an implementation of a networking environment. Programs 528 and/or program modules 530 generally perform the functions or methodologies of various embodiments.

Although the memory bus 503 is shown in FIG. 5 as a single bus structure providing a direct communication path among the CPUs 502, the memory subsystem 504, and the I/O bus interface 510, the memory bus 503 may, in some embodiments, include multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 510 and the I/O bus 508 are shown as single respective units, the computer system 501 may, in some embodiments, contain multiple I/O bus interface units 510, multiple I/O buses 508, or both. Further, while multiple I/O interface units are shown, which separate the I/O bus 508 from various communications paths running to the various I/O devices, in other embodiments some or all of the I/O devices may be connected directly to one or more system I/O buses.

In some embodiments, the computer system 501 may be a multi-user mainframe computer system, a single-user system, or a server computer or similar device that has little or no direct user interface, but receives requests from other computer systems (clients). Further, in some embodiments, the computer system 501 may be implemented as a desktop computer, portable computer, laptop or notebook computer, tablet computer, pocket computer, telephone, smartphone, network switches or routers, or any other appropriate type of electronic device.

It is noted that FIG. 5 is intended to depict the representative major components of an exemplary computer system 501. In some embodiments, however, individual components may have greater or lesser complexity than as represented in FIG. 5, components other than or in addition to those shown in FIG. 5 may be present, and the number, type, and configuration of such components may vary.

As discussed in more detail herein, it is contemplated that some or all of the operations of some of the embodiments of methods described herein may be performed in alternative orders or may not be performed at all; furthermore, multiple operations may occur at the same time or as an internal part of a larger process.

The present disclosure may be a system, a method, and/or a computer program product at any possible technical detail level of integration. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein. Although the present disclosure has been described in terms of specific embodiments, it is anticipated that alterations and modification thereof will become apparent to the skilled in the art. Therefore, it is intended that the following claims be interpreted as covering all such alterations and modifications as fall within the true spirit and scope of the disclosure.

What is claimed is:

1. A method for generating a channel level view of assets in a blockchain network, the method comprising:
   receiving, by a processor, channel information associated with one or more channels and one or more peers of the blockchain network;
   performing a map-reduce function on the channel information to determine a channel dataset associated with each of the one or more channels;
   analyzing the channel dataset to identify a status of one or more assets associated with the one or more channels; and
   providing the status of the one or more assets in a viewable channel to the blockchain network.

2. The method of claim 1, further comprising:
   initiating, in the one or more peers, a periodic sweep of one or more channels;
   receiving the channel information form the one or more channels from the periodic sweep; and
   performing the map-reduce function on the channel information using the channel information received from the periodic sweep to determine the channel dataset associated with each of the one or more channels.

3. The method of claim 2, further including:
   aggregating one or more channel datasets respectively associated with each of the one or more other channels to generate an asset inventory.

4. The method of claim 1, further comprising:
   initiating, in a first peer of the one or more peers, a periodic sweep of one or more channels associated with the first peer, wherein a first channel has one or more assets and is included in the one or more channels associated with the first peer;
   receiving the channel information from the periodic sweep associated with the one or more channels associated with the first peer; and
   determining, via the map-reduce function, a first dataset associated with the first channel and the one or more assets of the first channel, wherein the first dataset is a subset of the channel dataset.

5. The method of claim 1, further including:
analyzing the channel information associated with a first channel, of the one or more channels, wherein the first channel includes one or more assets associated with a first peer of the one or more peers, wherein the first channel links the first peer to a second peer;
determining a first dataset associated with the first channel and the one or more assets of the first channel, wherein the first data set is based on the map reduced function and the channel information;
analyzing the first dataset to determine a first status for the one or more assets of the first channel; and
providing the first status of the one or more assets of the first channel in the viewable channel to the blockchain network.

6. The method of claim 5, further including:
reading from the viewable channel, a second status of the one or more assets of the first channel, wherein the second status is determined by the second peer;
comparing the first status to the second status to verify the first status of the one or more assets of the first channel; and
providing results of the comparing to the viewable channel in the blockchain network.

7. The method of claim 5, further including:
receiving, from the second peer, a second status of the one or more assets of the first channel, wherein the second status is determined by the second peer;
comparing the first status to the second status to verify the first status of the one or more assets of the first channel; and
providing results of the comparing to the viewable channel to the blockchain network.

8. A system for a channel level view of assets in a blockchain network, the system comprising:
a memory; and
a processor in communication with the memory, the processor being configured to perform operations comprising:
receiving channel information associated with one or more channels and one or more peers of the blockchain network;
performing a map-reduce function on the channel information to determine a channel dataset associated with each of the one or more channels;
analyzing the channel dataset to identify a status of one or more assets associated with the one or more channels; and
providing the status of the one or more assets in a viewable channel to the blockchain network.

9. The system of claim 8, further comprising:
initiating, in the one or more peers, a periodic sweep of one or more channels;
receiving the channel information form the one or more channels from the periodic sweep; and
performing the map-reduce function on the channel information using the channel information received from the periodic sweep to determine the channel dataset associated with each of the one or more channels.

10. The system of claim 9, further including:
aggregating one or more channel datasets respectively associated with each of the one or more other channels to generate an asset inventory.

11. The system of claim 8, further comprising:
initiating, in a first peer of the one or more peers, a periodic sweep of one or more channels associated with the first peer, wherein a first channel has one or more assets and is included in the one or more channels associated with the first peer;
receiving the channel information from the periodic sweep associated with the one or more channels associated with the first peer; and
determining, via the map-reduce function, a first dataset associated with the first channel and the one or more assets of the first channel, wherein the first dataset is a subset of the channel dataset.

12. The system of claim 8, further including:
analyzing the channel information associated with a first channel, of the one or more channels, wherein the first channel includes one or more assets associated with a first peer of the one or more peers, wherein the first channel links the first peer to a second peer;
determining a first dataset associated with the first channel and the one or more assets of the first channel, wherein the first data set is based on the map reduced function and the channel information;
analyzing the first dataset to determine a first status for the one or more assets of the first channel; and
providing the first status of the one or more assets of the first channel in the viewable channel to the blockchain network.

13. The system of claim 12, further including:
reading from the viewable channel, a second status of the one or more assets of the first channel, wherein the second status is determined by the second peer;
comparing the first status to the second status to verify the first status of the one or more assets of the first channel; and
providing results of the comparing to the viewable channel in the blockchain network.

14. The system of claim 12, further including:
receiving, from the second peer, a second status of the one or more assets of the first channel, wherein the second status is determined by the second peer;
comparing the first status to the second status to verify the first status of the one or more assets of the first channel; and
providing results of the comparing to the viewable channel to the blockchain network.

15. A computer program product for a channel level view of assets in a blockchain network, the computer program product comprising a computer readable storage medium having program instructions embodied therewith, the program instructions executable by a processor to cause the processors to perform a function, the function comprising:
receiving channel information associated with one or more channels and one or more peers of the blockchain network;
performing a map-reduce function on the channel information to determine a channel dataset associated with each of the one or more channels;
analyzing the channel dataset to identify a status of one or more assets associated with the one or more channels; and
providing the status of the one or more assets in a viewable channel to the blockchain network.

16. The computer program product of claim 15, further comprising:
initiating, in the one or more peers, a periodic sweep of one or more channels;
receiving the channel information form the one or more channels from the periodic sweep; and
performing the map-reduce function on the channel information using the channel information received from the periodic sweep to determine the channel dataset associated with each of the one or more channels.

17. The computer program product of claim 16, further including:
aggregating one or more channel datasets respectively associated with each of the one or more other channels to generate an asset inventory.

18. The computer program product of claim 15, further comprising:
initiating, in a first peer of the one or more peers, a periodic sweep of one or more channels associated with the first peer, wherein a first channel has one or more assets and is included in the one or more channels associated with the first peer;
receiving the channel information from the periodic sweep associated with the one or more channels associated with the first peer; and
determining, via the map-reduce function, a first dataset associated with the first channel and the one or more assets of the first channel, wherein the first dataset is a subset of the channel dataset.

19. The computer program product of claim 15, further including:
analyzing the channel information associated with a first channel, of the one or more channels, wherein the first channel includes one or more assets associated with a first peer of the one or more peers, wherein the first channel links the first peer to a second peer;
determining a first dataset associated with the first channel and the one or more assets of the first channel, wherein the first data set is based on the map reduced function and the channel information;
analyzing the first dataset to determine a first status for the one or more assets of the first channel; and
providing the first status of the one or more assets of the first channel in the viewable channel to the blockchain network.

20. The computer program product of claim 19, further including:
reading from the viewable channel, a second status of the one or more assets of the first channel, wherein the second status is determined by the second peer;
comparing the first status to the second status to verify the first status of the one or more assets of the first channel; and
providing results of the comparing to the viewable channel in the blockchain network.

* * * * *